US006850422B2

United States Patent
Strijker

(10) Patent No.: US 6,850,422 B2
(45) Date of Patent: Feb. 1, 2005

(54) CONVERTER CIRCUIT WITH CONTROLLABLE SWITCHING MEANS UTILIZING A SWITCHING FREQUENCY WINDOW

(75) Inventor: Joan Wichard Strijker, Nijmegen (NL)

(73) Assignee: Koninklijke Philips Electronics N.V, Eindhoven (NL)

(*) Notice: Subject to any disclaimer, the term of this patent is extended or adjusted under 35 U.S.C. 154(b) by 0 days.

(21) Appl. No.: 10/241,084

(22) Filed: Sep. 11, 2002

(65) Prior Publication Data

US 2003/0090254 A1 May 15, 2003

(30) Foreign Application Priority Data

Sep. 17, 2001 (EP) ............................................ 01203508

(51) Int. Cl.⁷ ............................................. H02M 3/335
(52) U.S. Cl. ............................... 363/21.01; 363/21.05; 363/21.13; 363/97
(58) Field of Search ........................ 363/16, 20, 21.01, 363/21.02, 21.03, 21.04, 21.05, 21.12, 21.13, 95, 97

(56) References Cited

U.S. PATENT DOCUMENTS

| 5,754,414 A | 5/1998 | Hanington | 363/21.12 |
| 5,991,172 A | * 11/1999 | Jovanovic et al. | 363/21.14 |
| 6,370,045 B1 | * 4/2002 | Lurkens | 363/21.12 |
| 6,445,598 B1 | * 9/2002 | Yamada | 363/21.12 |

FOREIGN PATENT DOCUMENTS

WO PCT/EP00/04377 12/2000 .......... H02M/3/335

* cited by examiner

Primary Examiner—Michael Sherry
Assistant Examiner—Gary L. Laxton
(74) Attorney, Agent, or Firm—Michael J. Ure

(57) ABSTRACT

A converter for converting an input voltage ($U_i$) between a first supply terminal (1) and a second supply terminal (2) to an output voltage ($U_O$), which converter includes switching means ($S_O$) which, in the operating state of the converter, are alternately switched on and off under the control of a control signal ($V_{cntrl}$), an inductive element (T) which, in conjunction with the switching means ($S_O$), forms a series circuit which is coupled between the first supply terminal (1) and the second supply terminal (2), a control circuit (CNTRL) for supplying the control signal ($V_{cntrl}$), and evaluation means (EVMNS) for evaluating a voltage ($U_S$) across the switching means ($S_O$), which voltage ($U_S$) exhibits ringing, and for supplying the control circuit (CNTRL) with information causing the switching on of the switching means ($S_O$) during a given valley of the voltage ($U_S$) across the switching means ($S_O$). The converter remains locked to said valley for as long as the frequency of the control signal ($V_{cntrl}$) is within a given frequency window. The converter also includes a frequency control circuit (FC) for controlling the frequency of the control signal ($V_{cntrl}$) within the frequency window. If the frequency reaches the lowest frequency or the highest frequency of the frequency window, the information is adapted in such a way that the converter is locked to another valley of the voltage ($U_S$) across the switching means ($S_O$), so that the frequency of the control signal ($V_{cntrl}$) remains within the frequency window.

5 Claims, 9 Drawing Sheets

CONVERTER CIRCUIT WITH CONTROLLABLE SWITCHING MEANS UTILIZING A SWITCHING FREQUENCY WINDOW

BACKGROUND AND SUMMARY

The invention relates to a converter for converting an input voltage between a first supply terminal and a second supply terminal to an output voltage, which converter includes switching means which, in the operating state, are alternately switched on and off under the control of a switching control signal, an inductive element which forms a series circuit in conjunction with the switching means, which series circuit is coupled between the first supply terminal and the second supply terminal, a control circuit for supplying the switching control signal, and evaluation means for evaluating a voltage across the switching means, said voltage exhibiting oscillating, and for supplying the control circuit with information so as to ensure that, generally speaking, the switching means is switched on only during a given local valley of the voltage across the switching means.

A converter of this kind is shown in FIG. 1 and is known from U.S. Pat. No. 5,754,414. A primary winding of a transformer 12 is coupled, together with a switching transistor 18, between a first supply terminal $V_S$ and a second supply terminal GND in order to receive an input voltage $V_S$. The transformer 12 is also provided with a secondary winding 30. A voltage delivered by the secondary winding 30 is rectified by means of a diode 32 and subsequently smoothed by a smoothing capacitor 34, so that an output voltage $V_0$ is delivered between an output terminal $V_0$ and the second supply terminal GND. The operation of the known converter will be described in detail hereinafter with reference to the FIGS. 1 to 3. Between the instants $t_0$ and $t_1$ the base voltage $V_b$ (relative to the second supply terminal GND) of the switching transistor 18 is substantially equal to 0 volts, so that the switching transistor 18 is not turned on. Consequently, the collector voltage $V_c$ (relative to the second supply terminal GND) of the switching transistor 18 is substantially equal to the input voltage $V_S$. At the instant $t_1$ the base voltage $V_b$ is increased to such an extent that the switching transistor 18 is fully turned on, so that the collector voltage $V_c$ becomes practically equal to 0 volts. The voltage $V_b$ remains high until the instant $t_2$. As a direct consequence the voltage across the primary winding of the transformer 12 is substantially equal to the input voltage $V_S$ between the instant $t_1$ and the instant $t_2$, so that energy is stored in the primary winding of the transformer 12. At the instant $t_2$ the base voltage $V_b$ becomes substantially equal to 0 volts, so that the switching transistor 18 is abruptly switched off. Consequently, the stored energy is transferred to the secondary winding 30 and ultimately, via the rectifier diode 32, to a load (not shown in the Figures) which may be connected between the output terminal $V_0$ and the second supply terminal GND. The abrupt switching off of the switching transistor 18 at the instant $t_2$ causes a sudden increase of the collector voltage $V_C$ due to the inductance of the primary winding. The collector voltage $V_C$, therefore, is substantially higher than the input voltage $V_S$ directly after the instant $t_2$. The collector voltage $V_C$ subsequently starts to decrease as is indicated by the reference numeral 44 in FIG. 2. As from a given instant, denoted by the reference numeral 82, the collector voltage $V_C$ starts to exhibit oscillating. It is to be noted that the FIGS. 2 and 3 are shown in the cited United States patent specification in the context of an elucidation of conventional converters. However, the FIGS. 2 and 3 are also used to elucidate the known converter as described in the cited United States patent specification. For example, the cited United States patent specification states that, as is shown in the FIGS. 2 and 3, many conventional converters operate with a fixed switching frequency f. The switching frequency f is sufficiently low so that at the instant $t_3$, corresponding to the instant $t_1$, the collector voltage $V_C$ exhibits no or hardly any ringing; consequently, at the instant $t_3$ the switching transistor 18 can be switched on again without the risk of the collector voltage $V_C$ being much higher than the input voltage $V_S$ so that the dissipation of the switching transistor 18 would be unnecessarily high. The switching transistor 18 might even become defective. Moreover, at the instant at which oscillating of the collector voltage $V_C$ stops it can be established with certainty that the transfer of energy from the transformer 12 to the load has ended. Because such conventional converters operate with a fixed switching frequency f which is so low that it is absolutely certain that at the instant $t_3$ oscillating of the collector voltage $V_C$ has vanished, such conventional converters are not suitable for applications requiring a high switching frequency f. Therefore, in the known converter as shown in the cited United States patent specification steps are taken to ensure that this converter is suitable for a high switching frequency f. This means mainly that the converter adapts the switching frequency f each time, that is, also when the frequency of the ringing changes, in such a manner that the switching on of the switching transistor $T_{18}$ takes place in response to the first minimum (in the first valley) of the oscillating collector voltage $V_C$, said first minimum being denoted by the reference numeral 84 in FIG. 2. The transfer of energy from the transformer 12 to the load has not yet been completed at that instant. However, considering the fact that oscillating actually arises only at the instant at which the rectifier diode 32 starts to leave the conductive state, it will be evident that the major part of the energy has already been transferred to the load. The frequency of oscillating of the collector voltage $V_C$ is dependent, for example, on the type of transformer used. For this reason it is described in the cited United States patent that the switching frequency f of the converter should be variable and that it should be adapted automatically so as to ensure that the instant $t_3$, as indicated in FIG. 2, more or less coincides with the first minimum 84 of the oscillating collector voltage It is a drawback of a converter in conformity with the cited United States patent that the switching frequency can in principle assume any value. For example, the switching frequency may thus be allowed to assume a very high value so that the efficiency of the converter could suffer. A solution to this problem is described in international patent application PCT/EP00/04377. The switching means therein are not necessarily switched on in response to the first local minimum. The choice of a different local minimum (in a different valley) in response to which the switching means can be switched on is enabled by the recognition of the fact that the frequency of the ringing voltage is much higher than the frequency of the oscillator signal. Frequency variations of the voltage across the switching means then ultimately result in variations in the selection of a local minimum, so that the switching frequency of the converter remains practically constant and is actually determined by the frequency of the oscillator signal.

Even though the switching frequency of a converter in conformity with the cited international patent application is reasonably constant, a (slight) frequency variation takes place nevertheless when the converter switches over from a given local minimum to a different local minimum. Because this transition is very brief, it need not have adverse effects in principle. However, it often occurs in practice that the necessary switching frequency is not exactly compatible with a given local minimum. As a result, the converter is liable to switch over continuously between two adjoining local minima. The switching frequency then continuously toggles between two frequencies. This may cause an annoying noise (whistling), for example, from the transformer.

It is an object of the invention to provide a converter which eliminates the described drawbacks.

To this end, the control circuit includes a frequency control circuit for controlling the switching frequency of the switching control signal in such a manner that the switching frequency varies within a frequency window which is determined by a lower limit frequency and an upper limit frequency, and in such a manner that, when the switching frequency becomes equal to the lower limit frequency or to the upper limit frequency, the frequency control circuit adapts the switching frequency in such a manner that it again varies within a further frequency window which is determined by a further lower limit frequency and a further upper limit frequency, the information being adapted in such a manner that, generally speaking, the switching means is switched on only during a given valley other than said local valley of the voltage across the switching means.

Because of the frequency window, the switching frequency cannot assume an arbitrarily low or high value. This eliminates the cited drawback of the converter in conformity with the cited United States patent. If the amount of power taken up changes, the switching frequency also changes. When the correct converter is locked in a given local valley (preferably exactly at the minimum) of the voltage across the switching means, said valley has an associated power window in which the power taken up may vary and the switching frequency of the switching means remains within the frequency window. If the power taken up leaves said power window, said information is adapted in such a manner that the converter is locked in a different valley. Said different valley is associated with another power window again. Because said other power window partly overlaps the former power window, actually a so-called hysteresis effect occurs between the locking from one valley to another valley. Periodic toggling of the switching frequency is thus avoided (unless the power consumption exhibits comparatively large periodic fluctuations). Annoying noise from the converter, such as a whistling noise from the transformer, is thus avoided.

In an embodiment of a converter in accordance with the invention the lower limit frequency of the further frequency window is equal to the lower limit frequency of the frequency window, and that the upper limit frequency of the further frequency window is the same as the upper limit frequency of the frequency window. This offers the advantage that only one frequency window is required.

In an embodiment of a converter in accordance with the invention the information includes an evaluation signal for indicating when the voltage across the switching means is lower than the input voltage, and also a further evaluation signal for indicating when the time derivative of the voltage across the switching means is approximately equal to zero. The evaluation signal ensures that the switching means can never be switched on when the voltage across the switching means is higher than the input voltage. The further evaluation signal ensures, in conjunction with the evaluation signal, that the switching means, generally speaking, can be switched on only during the minimum value of the valley in which the converter is locked. It may be advantageous to issue a command for switching on the switching means already just before the time derivative of the voltage across the switching means becomes equal to zero. Said derivative then has a small negative value. This is because electronic control circuits always require a given response time. This response time can be anticipated by attempting to switch on the switching means already when said derivative has a given small negative value. The exact value can be determined by experiments and/or simulations. Despite the required response time, the switching means can then be switched on exactly at an instant at which the voltage across the switching means exhibits a local minimum.

In an embodiment of a converter in accordance with the invention the frequency control circuit includes: a first counter with an up-input, a down-input, and a data output; a second counter with a reset input, an up-input and a data output; a digital comparator with a first data input which is coupled to the data output of the first counter, a second data input which is coupled to the data output of the second counter, and an output for supplying the switching control signal; means which are coupled so as to receive a first frequency reference signal which corresponds to the lower limit frequency and a second frequency reference signal which corresponds to the upper limit frequency, the means comparing the frequency of the switching control signal with the first frequency reference signal and with the second frequency reference signal, and supplying, in response to said comparison, either a down signal to the down-input or an up signal to the up-input of the first counter; and means for delivering a valley number signal of the ringing voltage, said valley number signal being derived from the evaluation signal and the further evaluation signal. A predominantly digital implementation is thus obtained for the frequency control circuit. Said means which are coupled so as to receive the first and the second frequency reference signals may be constructed, for example, in such a manner that the first and the second frequency reference signals are AC signals whose frequencies are related to the lower limit frequency and the upper limit frequency, respectively, of the frequency window. The first and the second frequency reference signals may also be, for example, DC voltages which correspond to the lower limit frequency and the upper limit frequency, respectively.

In an embodiment of a converter in accordance with the invention the means for delivering the valley number signal include an AND gate which has a first input for receiving the evaluation signal, a second input for receiving the further evaluation signal, and an output for delivering the valley number signal to the up-input of the second counter. This is a very simple implementation for the means for providing the valley number signal.

In an embodiment of a converter in accordance with the invention the frequency control circuit includes: a voltage-controlled oscillator which has an input for receiving a VCO control voltage and an output for supplying an oscillator signal; a first frequency control capacitor for supplying the VCO control voltage; a second frequency control capacitor; adaptation means for adapting a voltage across the first frequency control capacitor and the VCO control voltage by connecting the first frequency control capacitor and the second frequency control capacitor in parallel for approximately the period of time during which the switching means are switched on, and by discharging the second frequency control capacitor for approximately the period of time during which the switching means are switched off, and by applying the voltage across the second frequency control capacitor with a value which is higher than the value of the VCO control voltage during a part of the period of time during which the switching means are switched off, said part being determined by the oscillator signal. A predominantly analog implementation is thus obtained for the frequency control circuit.

In an embodiment of a converter in accordance with the invention the frequency control circuit also includes limiting means for limiting the voltage range of the VCO control voltage to a voltage window which is determined by a lower voltage limit which corresponds to the lower limit frequency and an upper voltage limit which corresponds to the upper limit frequency. This is a simple method of defining the frequency window.

In an embodiment of a converter in accordance with the invention the previous embodiment of the frequency control circuit also includes an AND gate with a first input for receiving the evaluation signal, a second input for receiving the further evaluation signal, a third input for receiving the oscillator signal, and an output for supplying the switching control signal. This is a very simple realization to ensure that the switching means can be switched on only if so permitted by the evaluation signal as well as the further evaluation signal and the oscillator signal.

BRIEF DESCRIPTION OF THE DRAWINGS

The invention will be described in detail hereinafter with reference to the drawing; therein.

DETAILED DESCRIPTION

Figure 1:
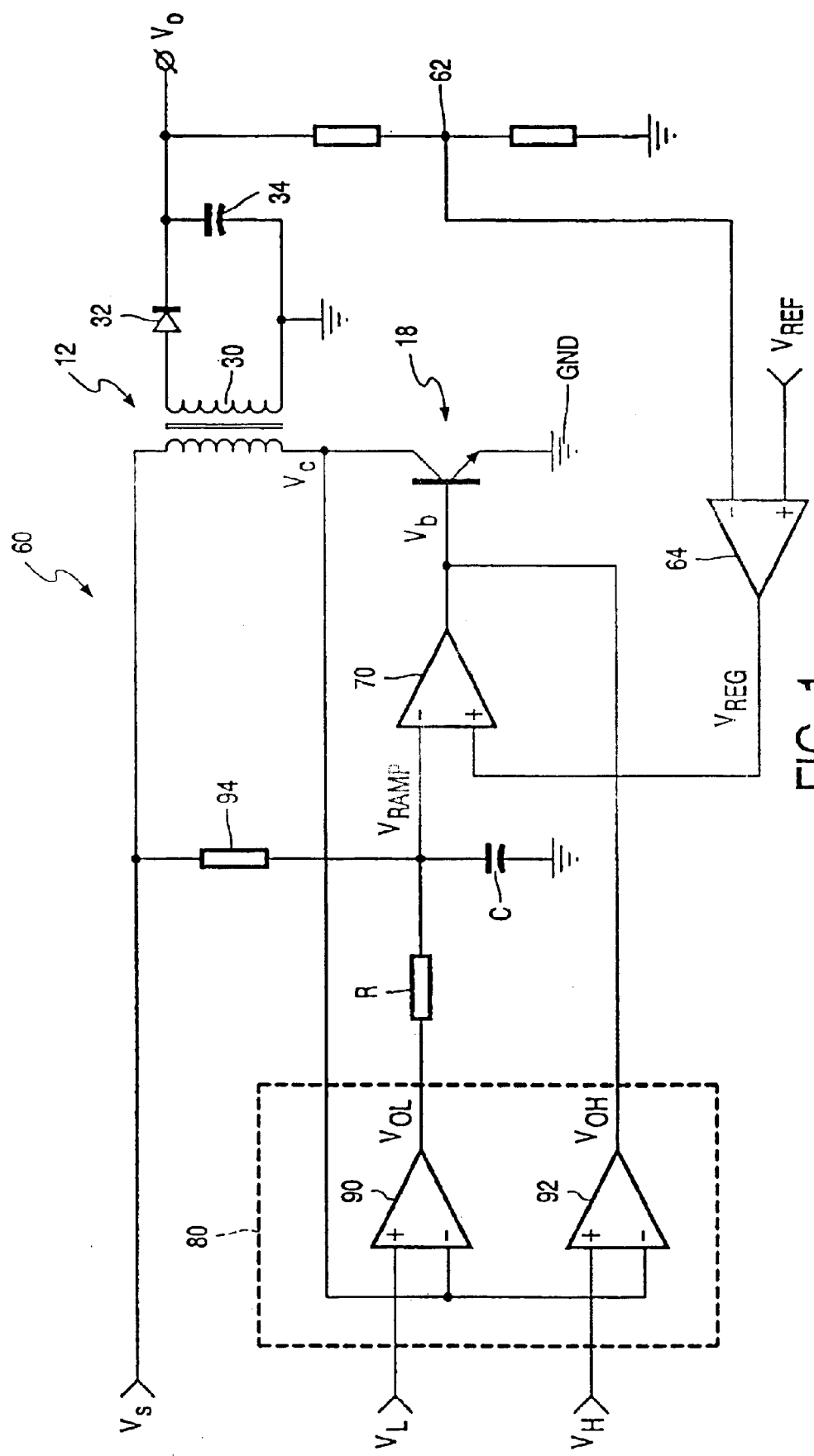
FIG. 1 shows an electrical circuit diagram of a known converter as proposed in U.S. Pat. No. 5,754,414.
Figure 2:
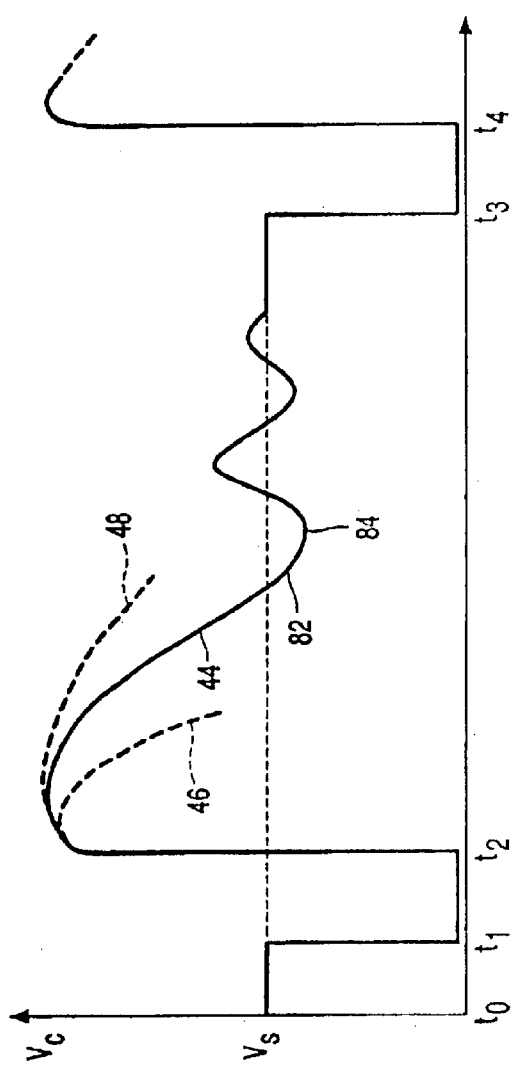
FIGS. 2 and 3 show graphs elucidating the electrical circuit diagram of FIG. 1.
Figure 3:
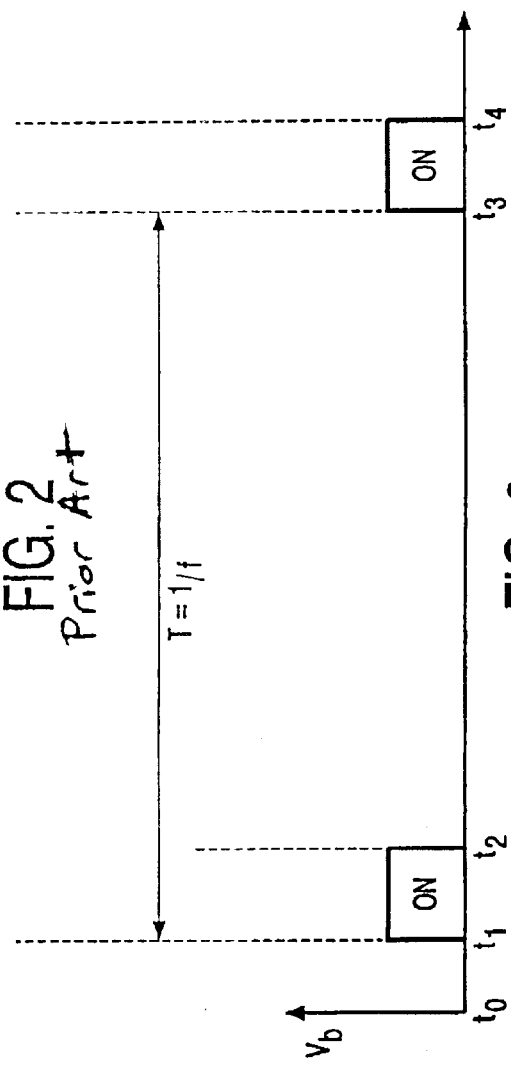

Corresponding parts or elements are denoted by corresponding reference numerals in the FIGS. 4 to 10.

Figure 4:
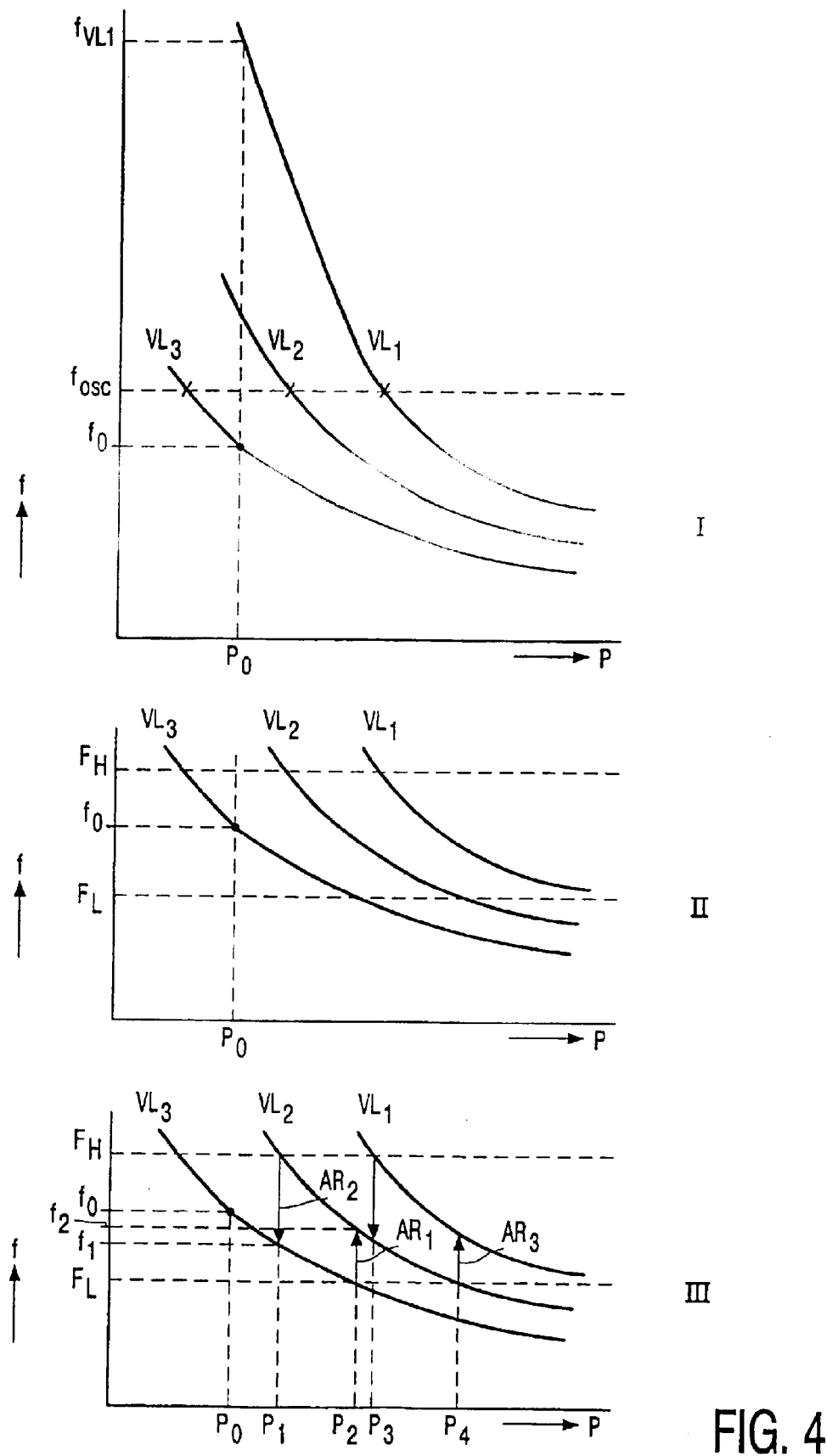
FIG. 4 shows a set of diagrams I–III with a relation between the switching frequency f of the switching control signal and the power P taken up in known converters (I) and the converter in accordance with the invention (II and III) so as to provide a further explanation of the operation of the converter in accordance with the invention.

The diagram I of FIG. 4 illustrates the relationship between the switching frequency f of the switching control signal and the power P taken up in the known converter in conformity with the international patent application PCT/EP00/04377. The value of the switching frequency f remains roughly constant and is represented by as the frequency $f^{osc}$. If the power P taken up changes, another valley is selected; for example, switching over takes place from the valley $VL_2$ to the valley $VL_3$. However, assume that the value of the power P taken up corresponds to the indicated value $P_0$. In the known converter in conformity with the cited U.S. Pat. No. 5,754,414 the value of the switching frequency f would become equal to the indicated (very high) value $f_{VL1}$. In the known converter in conformity with the international patent application PCT/EP00/04377 no such increase takes place, because this converter more or less dictates that the switching frequency f should remain (approximately) equal to the value $f_{OSC}$. What happens is that the converter starts to toggle continuously (see the indicated crosses) between the valley $VL_2$ and the valley $VL_3$.

The diagrams II and III of FIG. 4 show the relationship between the switching frequency f of the switching control signal and the power P taken up in the converter in accordance with the invention. In the diagram II it is indicated that the converter is locked in the third valley $VL_3$. The value of the switching frequency f corresponds to the indicated value $f_0$. When the power P taken up changes, the switching frequency f also changes. The converter then remains locked in the third valley $VL_3$ for as long as the switching frequency f has a value which is higher than a lower limit frequency $F_L$ and lower than an upper limit frequency $F_H$.

The diagram III of FIG. 4 shows the operation of the converter also in the case where the lower limit frequency $F_L$ or the upper limit frequency $F_H$ is reached. Assume that the power P taken up equals $P_0$ at a given instant, the switching frequency f being equal to $f_0$ and the converter being locked in the third valley $VL_3$. If the power P taken up increases, the switching frequency f then decreases. When the power P has become equal to $P_2$, the switching frequency f equals the lower limit frequency $F_L$. The converter then switches over from the third valley $VL_3$ to the second valley $VL_2$. This transition is indicated by the arrow $AR_1$. The switching frequency f is then increased to the value $f_2$. For as long as the switching frequency f remains within the frequency window (determined by the lower limit frequency $F_L$ and the upper limit frequency $F_H$), the converter will remain locked in the second valley $VL_2$. With each valley there is associated a power window which corresponds to the frequency window. For example, with the second valley there is associated a power window which is defined by the powers $P_1$ and $P_4$. This means that as from the instant at which the converter is locked in the second valley $VL_2$, it remains locked therein for as long as the power taken up is greater than $P_1$ and smaller than $P_4$. Thus, an overlap exists between the adjoining power windows. This gives rise to a hysteresis effect so that the toggling between two adjoining valleys is avoided. It is to be noted that only one frequency window is indicated in the diagrams II and III, and also in the embodiments of a converter in accordance with the invention which are yet to be described. However, it is in principle also possible to operate with different frequency windows; in that case, for example, each power window corresponds to a respective frequency window.

Figure 5:
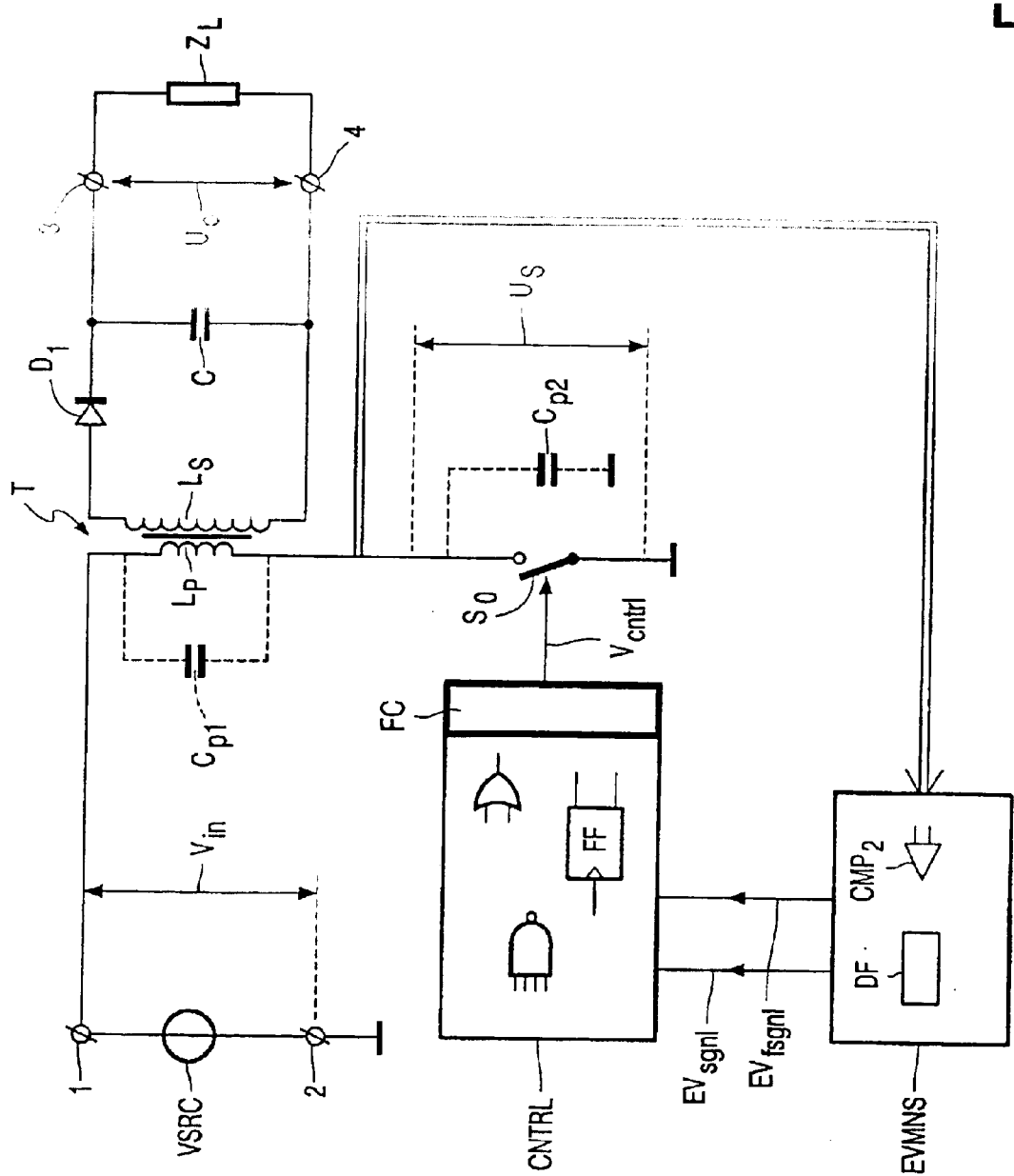
FIGS. 5, 7, 8 and 10 show electrical circuit diagrams of embodiments of a converter in accordance with the invention.

FIG. 5 shows an electrical circuit diagram of an embodiment of a converter in accordance with the invention. The converter includes switching means $S_0$, or a switch $S_0$, which is alternately switched on and off under the control of a switching control signal $V_{cntrl}$, and an inductive element T which in the present embodiment is constructed so as to have a transformer T with a primary winding $L_P$ and a secondary winding $L_S$. The switch $S_0$ and the primary winding $L_P$ together constitute a series circuit which is connected, by way of a first connection point, to a first supply terminal 1 and to a second supply terminal 2, by way of a second connection point, in order to receive an input voltage $V_{in}$ which is supplied by a voltage source VSRC. A first capacitor $C_{p1}$ is a parasitic capacitance of the primary winding $L_P$. A second capacitor $C_{p2}$ is a parasitic capacitance of the switch $S_0$. A rectifier diode $D_1$ is coupled between a first connection point of the secondary winding $L_S$ and a first output terminal 3. A second connection point of the secondary winding $L_S$ is connected to a second output terminal 4. A smoothing capacitor C is coupled between the first output terminal 3 and the second output terminal 4. A load $Z_L$ is coupled between the first output terminal 3 and the second output terminal 4 in order to receive an output voltage $U_0$. The converter also includes a control circuit $C_{NTRL}$ for delivering a switching control signal $V_{cntrl}$ to the switch $S_0$, and also evaluation means EVMNS for evaluating a voltage $U_S$ across the switch $S_0$. The evaluation means EVMNS supply the control circuit CNTRL with an evaluation signal $EV_{sgnl}$ and with a further evaluation signal $EV_{fsgnl}$. The control circuit CNTRL also includes a frequency control circuit FC for controlling the switching frequency f of the switching control signal $V_{cntrl}$ in a manner such that the switching frequency f can vary within a frequency window which is determined by the lower limit frequency $F_L$ and the upper limit frequency $F_H$.

Figure 6:
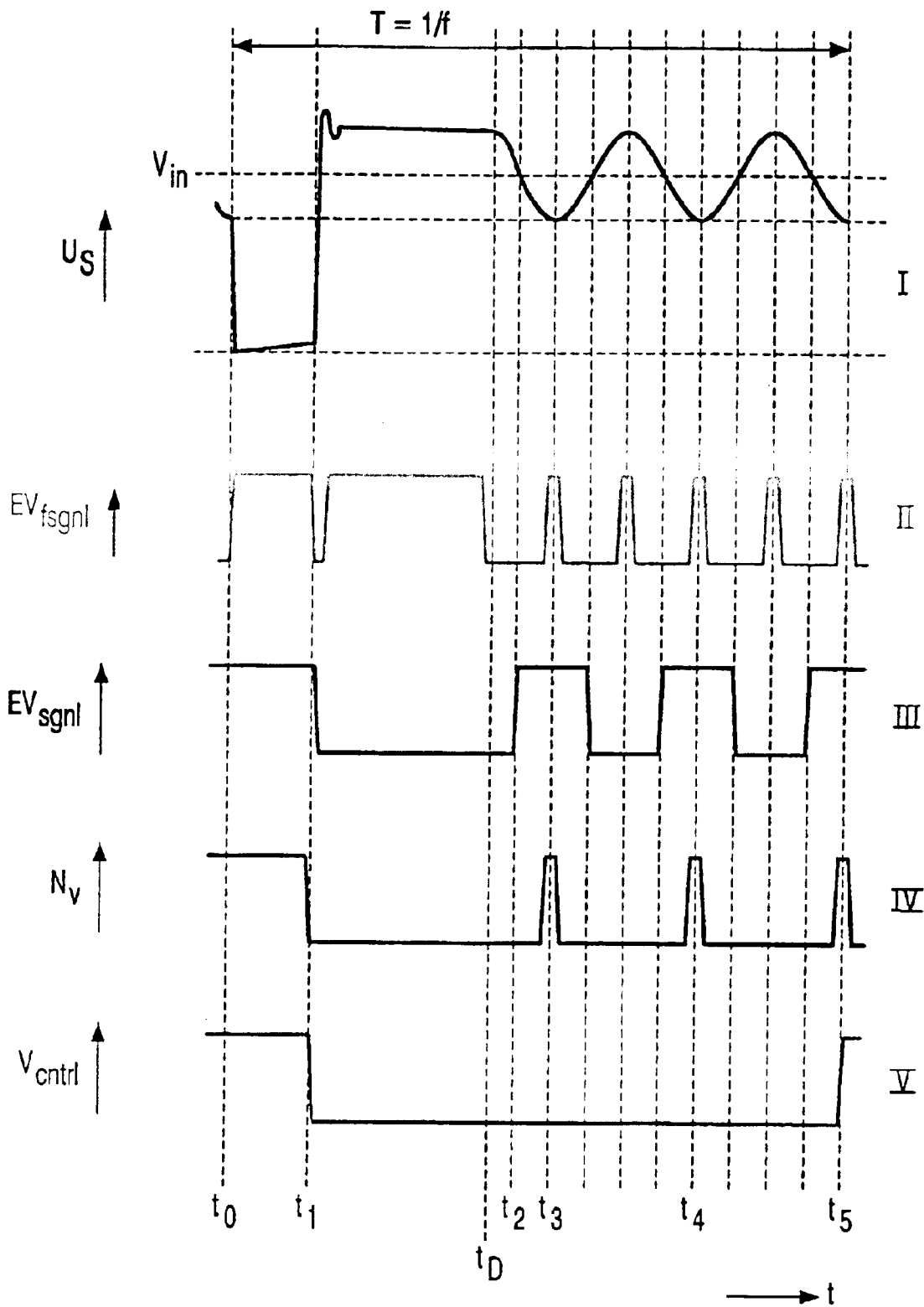
FIGS. 6 and 9 show signal diagrams for a further elucidation of the embodiments shown.

The operation of the embodiment as shown in FIG. 5 will be described in detail hereinafter with reference to the set of signal diagrams I, II, III and V as shown in FIG. 6. FIG. 6 shows the situation in which the converter is locked in the third valley $VL_3$ (see also FIG. 4). Between the instant to and the instant $t_1$ the switching control signal $V_{cntrl}$ has a high value such that the switch $S_0$ is closed. Consequently, the voltage across the primary winding $L_P$ is substantially equal to the input voltage $V_{in}$. Between the instant to and the instant $t_1$ energy is stored in the primary winding $L_P$ of the transformer T. At the instant $t_1$ the switching control signal $V_{cntrl}$ becomes substantially equal to zero volts, so that the switch $S_0$ is opened. As from the instant $t_1$ the energy stored in the primary winding $L_P$ is transferred to the secondary winding $L_S$ after which it is delivered, via the rectifier diode $D_1$, to the load $Z_L$. As from approximately an instant $t_D$ the current flowing through the rectifier $D_1$ becomes so small that the rectifier diode $D_1$ acts practically as an open connection. Consequently, as from approximately the instant $t_D$ the transformer T is practically not loaded, so that a resonant circuit which is formed by the primary winding $L_P$ and the parallel connection (via the voltage source VSCR) of the first capacitor $C_{p1}$ and the second capacitor $C_{p2}$, is practically not damped. Consequently, the voltage $U_S$ across the switch $S_0$ starts to oscillate. At the instant $t_5$ the switch $S_0$ is closed again, so that energy is stored once more in the primary winding $L_P$ of the transformer T.

Should the frequency of oscillating voltage $U_S$ change for some reason, the switching frequency f of the switching control signal $V_{cntrl}$ also changes so that the converter remains locked in the third valley $VL_3$, that is, at least for as long as the switching frequency f remains within the frequency window which is defined by the lower limit frequency $F_L$ and the upper limit frequency $F_H$.

Figure 7:
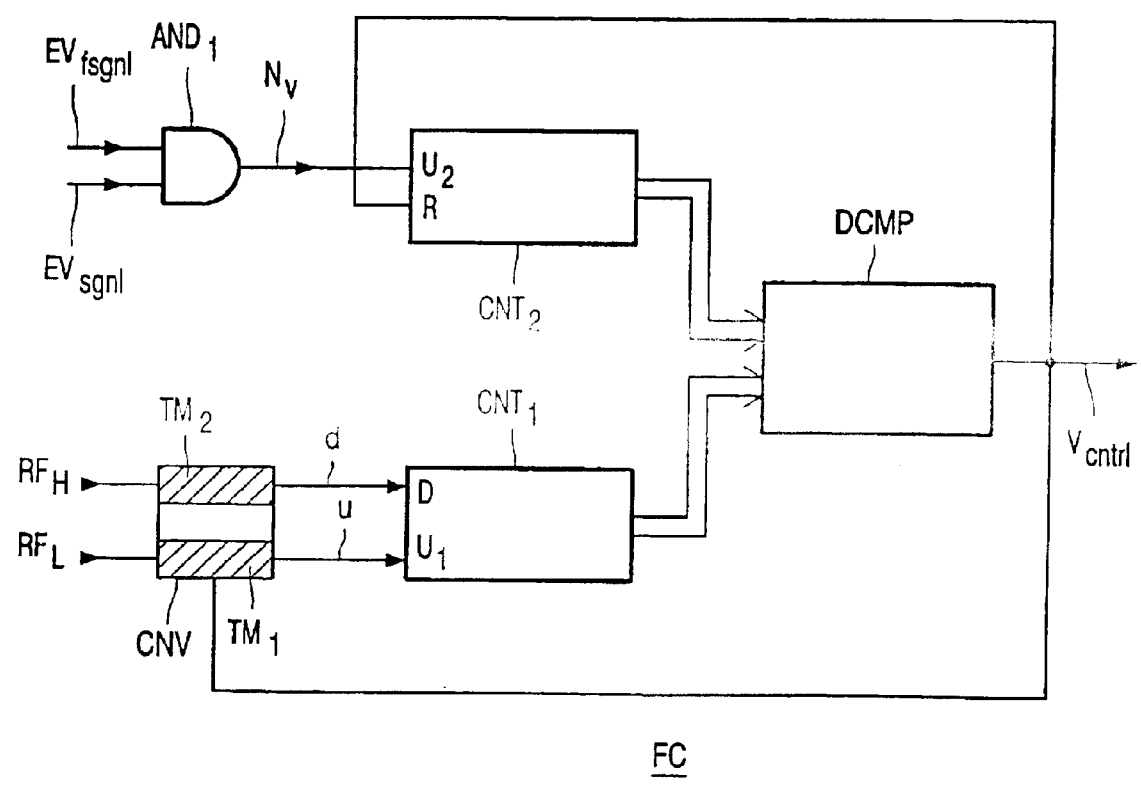

FIG. 7 shows an electrical circuit diagram of an embodiment of the frequency control circuit FC. The frequency control circuit FC includes: a first counter $CNT_1$ with an up-input $U_1$ a down-input D, and a data output; a second counter $CNT_2$ with a reset input R, an up-input $U_2$ and a data output; a digital comparator DCMP with a first data input which is coupled to the data output of the first counter $CNT_1$ and a second data input which is coupled to the data output of the second counter $CNT_2$, and an output for supplying the switching control signal $V_{cntrl}$; means CNV which are coupled so as to receive a first frequency reference signal $RF_L$ which corresponds to the lower limit frequency $F_L$ and a second frequency reference signal $RF_H$ which corresponds to the upper limit frequency $F_H$; means for supplying a valley number signal $N_v$ of oscillating voltage $U_S$; and an AND gate $AND_1$, an output of which is connected to the up-input $U_2$ and a first input of which is coupled so as to receive the evaluation signal $EV_{sgnl}$ whereas a second input is coupled so as to receive the further evaluation signal $EV_{fsgnl}$. The reset input R of the second counter $CNT_2$ is connected to the output of the digital comparator DCMP.

The operation of the embodiment of the frequency control circuit FC as shown in FIG. 7 will be described in detail hereinafter with reference to the set of signal diagrams I, II, III, IV and V as shown in FIG. 6. The AND gate $AND_1$ supplies the valley number signal $N_v$. As is shown in FIG. 6, the valley number signal $N_v$ is logic high between the instants $t_1$ and $t_5$ only if the voltage $U_S$ exhibits a local minimum. The fact that the valley number signal $N_v$ is also logic high between the instants $t_0$ and $t_1$ does not disturb the operation of the second counter $CNT_2$, because this counter is then reset since the switching control signal $V_{cntrl}$ is logic high during the period between the instants $t_0$ and $t_1$. For example, the means CNV may be constructed in such a manner that the first and the second frequency reference signals $RF_L$ and $RF_H$ are AC signals whose frequencies correspond to the lower limit frequency $F_L$ and the upper limit frequency $F_H$, respectively, of the frequency window (see also FIG. 4). For example, the first and the second frequency reference signals $RF_L$ and $RF_H$ may be DC voltages which correspond to the lower limit frequency $F_L$ and the upper limit frequency $F_H$, respectively. In both cases coupling is necessary between the output of the digital comparator DCMP (or a junction which represents the same information as the switching control signal $V_{cntrl}$) and the means CNV.

In the case where the first and the second frequency reference signals $RF_L$ and $RF_H$ are DC voltages, the means CNV may be provided (as shown in FIG. 7) with a first timer $TM_1$ for receiving the first DC voltage $RF_L$ and with a second timer $TM_2$ for receiving the second DC voltage $RF_H$.

The operation of the frequency control circuit FC as shown in FIG. 7 is as follows. In the first counter $CNT_1$ there is stored a value which corresponds to the valley whereto the converter is locked. Therefore, if the converter is locked, for example, to the third valley $VL_3$ as in the instantaneous situation of FIG. 6, the number 3 is stored in the first counter $CNT_1$. The second counter $CNT_2$ then counts the number of valleys after the switching off of the switch $S_0$ or after the switching control signal $V_{cntrl}$ has become logic low. This is the case as from the instant $t_1$ in FIG. 6. Each time when the valley number signal $N_v$ becomes logic high (see diagram IV of FIG. 6) the value in the second counter $CNT_2$ is incremented by one. This continues until the value in the second counter $CNT_2$ becomes equal to the value in the first counter $CNT_1$. When the value in the second counter $CNT_2$ becomes equal to the value in the first counter $CNT_1$, correspondence is detected by the digital comparator DCMP which, in response to such detection, changes the switching control signal $V_{cntrl}$ from a logic low level to a logic high level. This takes place at the instant $t_5$ in FIG. 6. The first and second timers $TM_1$ and $TM_2$ actually measure the period duration T of the switching control signal $V_{cntrl}$ and hence indirectly also the switching frequency f (f=1/T). Depending on the value of this period duration and the DC voltage levels of the first and the second frequency reference signals $RF_L$ and $RF_H$, if at a given instant the period duration of the switching control signal $V_{cntrl}$ has become too long or too short, either the first timer $TM_1$ applies an up signal u to the up-input $U_1$ with the result that the value stored in the first counter $CNT_1$ is incremented by one, or the second timer $TM_2$ applies a down signal d to the down-input D, with the result that the value stored in the first counter $CNT_1$ is decremented by one. Assume that in the present example the second timer $TM_2$ applies a down signal d to the down-input D; in that case the newly stored instantaneous value in the first counter $CNT_1$ becomes equal to 2. The converter is then switched over from the third valley $VL_3$ to the second valley $VL_2$. The second counter $CNT_2$ then continues to count until it reaches the value 2, because as from this value the digital comparator DCMP will detect that the stored value has become equal to the (new) stored value of the first counter $CNT_1$. The converter thus remains locked in the second valley $VL_2$ until a down-signal d or an up signal $U_1$ is applied again to the first counter $CNT_1$. The switching frequency f thus always remains within the desired frequency window. This is because the DC voltages $RF_L$ and $RF_H$ correspond to the lower limit frequency $F_L$ and the upper limit frequency $F_H$, respectively.

Figure 8:
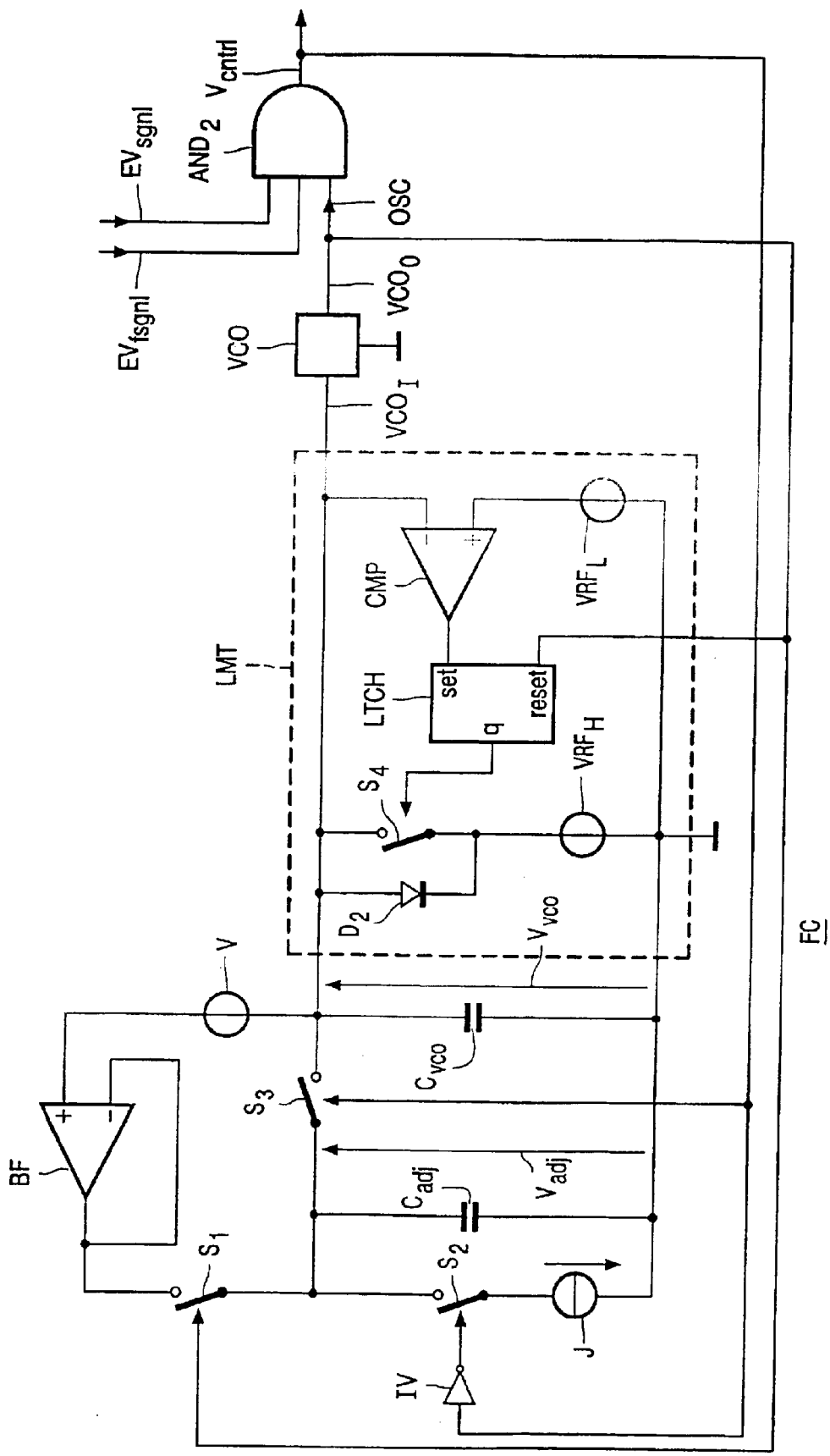

FIG. 8 shows an electrical circuit diagram of a further embodiment of the frequency control circuit FC. The frequency control circuit FC includes: a voltage-controlled oscillator VCO with an input $VCO_I$ for receiving a VCO control voltage $V_{vco}$, and an output $VCO_I$ for supplying an oscillator signal OSC; a first frequency control capacitor $C_{vco}$ for supplying the VCO control voltage $V_{vco}$; a second frequency control capacitor $C_{adj}$; adaptation means for adapting a voltage $V_{adj}$ across the second frequency control capacitor $C_{adj}$ and the VCO control voltage $V_{vco}$. The adaptation means include a buffer BF; voltage supply means or a voltage source V; a first switch $S_1$; a second switch $S_2$; a third switch $S_3$; a current source J; and an inverter IV. The frequency control circuit FC also includes limiting means LMT for limiting the voltage range of the VCO control voltage $V_{vco}$. The frequency control circuit FC also includes an AND gate $AND_2$ with a first input for receiving the evaluation signal $EV_{sgnl}$, a second input for receiving the further evaluation signal $EV_{fsgnl}$, a third input which is connected to the output $VCO_I$ of the oscillator VCO, and an output for delivering the switching control signal $V_{cntrl}$.

The capacitor $C_{vco}$ is connected between the input $VCO_I$ and a ground reference terminal. The capacitor $C_{adj}$ is connected, by way of a first connection point, to the ground reference terminal and, by way of a second connection point and the switch $S_3$, to the input $VCO_I$. A control electrode of the switch $S_2$ is connected to the input of the inverter IV and to the output of the AND gate $AND_2$. The first switch $S_1$ is connected, by way of a first connection point, to an output of the buffer BF and, by way of the second connection point, to the second connection point of the capacitor $C_{adj}$. A control electrode of the switch $S_1$ is connected to the output $VCO_O$. The second switch $S_2$ is connected, by way of a first connection point, to the second connection point of the capacitor $C_{adj}$ and, by way of a second connection point, to the current source J. A control electrode of the switch $S_3$ is connected to an output of the inverter IV.

The limiting means LMT include: a comparator $CMP_1$ with a plus input, a minus input, and an output; a first voltage reference means, or a first voltage reference source $VRF_L$; a second voltage reference means, or a second voltage reference source $VRF_H$; a latch LTCH with a set input, a reset input, and a q output; a fourth switch $S_4$; and a diode $D_2$. The voltage reference source $VRF_L$ is connected between the plus input of the comparator $CMP_1$ and the ground reference terminal. The minus input of the comparator $CMP_1$ is connected to the input $VCO_I$. The output of the comparator $CMP_1$ is connected to the set input of the latch LTCH. The reset input of the latch LTCH is connected to the output $VCO_O$. The voltage reference source $VRF_H$ is connected between a first connection point of the switch $S_4$ and the ground reference terminal. A second connection point of the switch $S_4$ is connected to the input $VCO_I$. A control electrode of the fourth switch $S_4$ is connected to the q output of the latch LTCH. The diode $D_2$ is coupled parallel to the switch $S_4$.

Figure 9:
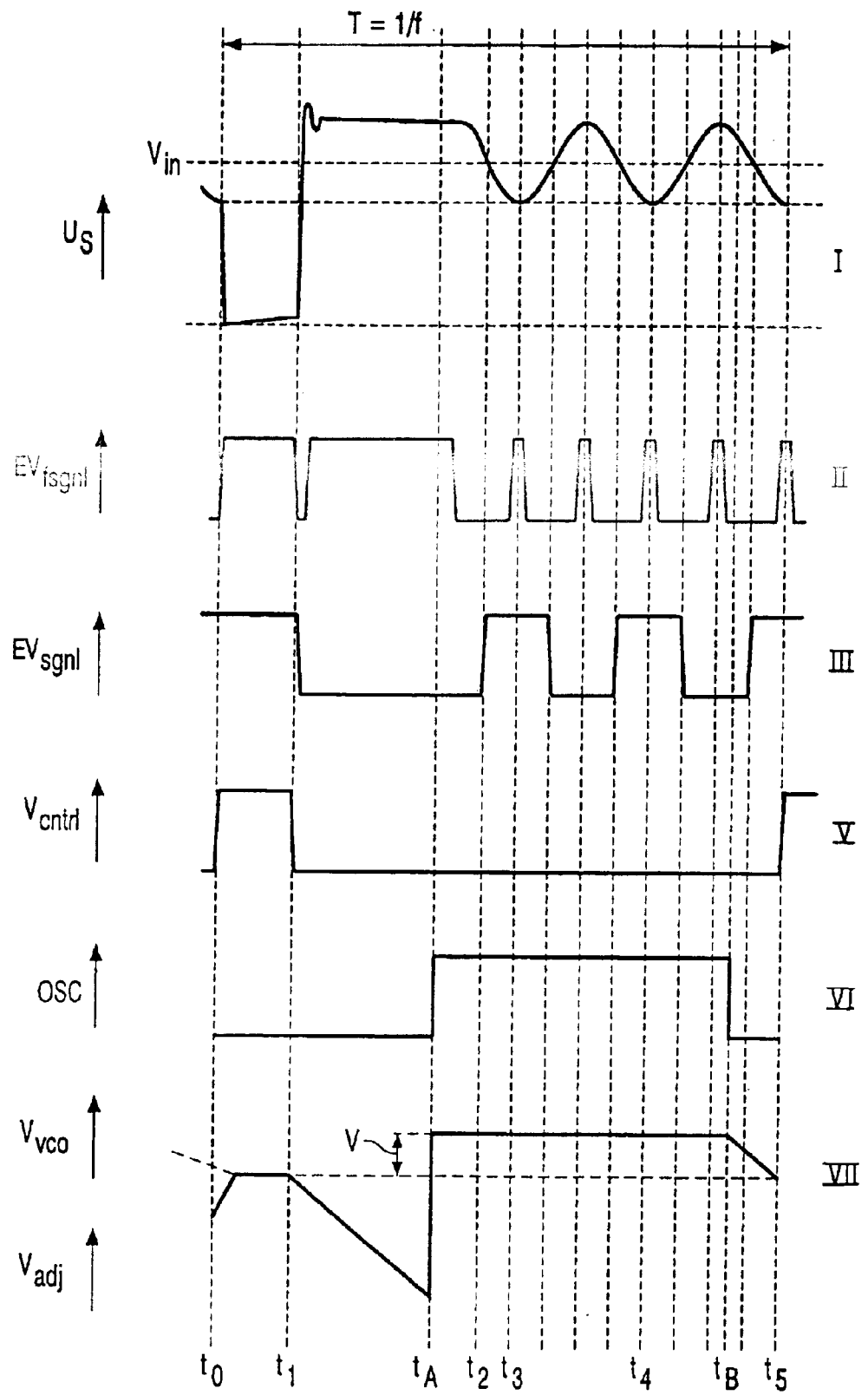

The operation of the frequency control circuit FC as shown in FIG. 8 will now be described in detail with reference to the set of signal diagrams I, II, III, V, VI and VII of FIG. 9. A voltage $V_{vco}$ (see the dashed signal line in the diagram VII of FIG. 9) across the capacitor $C_{vco}$ determines the frequency of the oscillator signal OSC and hence the switching frequency f of the switching control signal $V_{cntrl}$. The diagram VII of FIG. 9 also shows, in the form of a non-interrupted signal line, a voltage $V_{adj}$ across the capacitor $C_{adj}$. The oscillator signal OSC is represented in the diagram VI of FIG. 9. In the present example the oscillator signal OSC changes from a logic low value to a logic high value at the instant $t_A$ and from a logic high value to a logic low value at the instant $t_B$. At the instant to the switch $S_0$ (see FIG. 5) is switched on because the switching control signal $V_{cntrl}$ assumes a logic high value. The switching control signal $V_{cntrl}$ remains logic high between the instant to and the instant $t_1$. The switch $S_3$ is switched on and the switch $S_2$ is switched off between the instant to and the instant $t_1$. The switch $S_1$ is switched off between the instant to and the instant $t_A$ because the oscillator signal OSC then has a logic low value. At the instant to the capacitors $C_{adj}$ and $C_{vco}$ are actually coupled in parallel. Consequently, the voltages $V_{adj}$ and $V_{vco}$ become equal within a comparatively short period of time. (Because in the present example the voltage $V_{vco}$ was higher than the voltage $V_{adj}$ prior to the instant $t_0$, the voltage $V_{adj}$ increases directly after the instant $t_0$ while the voltage $V_{vco}$ decreases). The voltages $V_{adj}$ and $V_{vco}$ remain equal until the instant $t_1$ at which the switching control signal $V_{cntrl}$ assumes a logic low value again and hence the switch $S_0$ is switched off again. Because the switch $S_3$ is switched off again as from the instant $t_1$ and because the voltage $V_{vco}$ is still (roughly) below the voltage value $VRF_H$ and hence the limiting means LMT do not form a load for the capacitor $C_{vco}$, the voltage $V_{vco}$ remains constant as from the instant $t_1$. However, the voltage $V_{adj}$ decreases between the instant $t_1$ and the instant $t_A$, because the switch $S_2$ is switched on so that the capacitor $C_{adj}$ is discharged via the current source J. The fact that the voltage $V_{adj}$ linearly decreases between the instant $t_1$ and the instant $t_A$ in the diagram VII of FIG. 9 is due to the fact that the current source J delivers a constant current. This is not strictly necessary. The current source J, for example, may be replaced by a resistor so that the current decrease between the instant $t_1$ and the instant $t_A$ is not linear.

At the instant $t_A$ the oscillator signal OSC becomes logic high, so that the switch $S_1$ is switched on. The buffer BF, having a low output impedance, thus enforces a voltage on the capacitor $C_{adj}$. Because an input of the buffer BF is connected, via the voltage source V which supplies a voltage having a value V, to the input $VCO_i$, at the instant $t_A$ the voltage becomes equal to the voltage $V_{vco}$ increased by the voltage V. This remains so until at the instant $t_B$ the oscillator signal OSC becomes logic low again. Because the switching control signal $V_{cntrl}$ still has a logic low value between the instant $t_B$ and the instant $t_5$, and hence the switch $S_2$ is still switched on, the capacitor $C_{adj}$ is discharged again by the current source J.

If at the instant $t_5$ the voltages $V_{vco}$ and $V_{adj}$ are exactly equal, as in the example illustrated in FIG. 9 (diagram VII), the oscillator frequency is no longer changed (for as long as no changes occur in, for example, the load) and the converter remains locked in the relevant valley (being the valley $VL_3$ in FIG. 9). However, if changes occur, the oscillator VCO will adapt its frequency again, and hence also the switching frequency f. However, if the frequency drops below the lower limit frequency $F_L$ or rises beyond the upper limit frequency $F_H$ (see FIG. 4), the converter has to switch over to a different valley. Because the voltage $V_{vco}$ determines the frequency of the oscillator signal VCO, therefore, a relationship exists between a voltage window concerning the voltage $V_{vco}$ and the frequency window. The frequency window is defined by a lower value of the voltage $V_{vco}$ which corresponds to the lower limit frequency $F_L$ and by an upper value of the voltage $V_{vco}$ which corresponds to the upper limit frequency $F_H$. These voltage limits of the voltage $V_{vco}$ are imposed by means of the voltage reference source $VRF_L$ and the voltage reference source $VRF_H$ (the threshold voltage of the diode $D_2$ is ignored in this context).

When the voltage $V_{vco}$ becomes higher than the voltage $VRF_H$, and hence the upper limit frequency $F_H$ is reached, the diode $D_2$ becomes conductive so that the voltage $V_{vco}$ cannot increase further. Consequently, the converter automatically switches over to a different valley, for example, from the third valley $VL_3$ to a fourth valley $VL_4$, so that the switching frequency f becomes lower again and hence the voltage $V_{vco}$ will ultimately become lower again than $V_{RFH}$. Analogously, when the voltage becomes lower than the voltage $VRF_L$ the voltage $V_{vco}$ can be limited so that the converter automatically switches over to a different valley, for example, from the third valley $VL_3$ to the second valley $VL_2$. In this context, however, the frequency control circuit FC as shown in FIG. 8 also has a special and also simple embodiment. As soon as the voltage $V_{vco}$ becomes lower than the voltage $VRF_L$, and hence the lower limit frequency $F_L$ is reached, the voltage at the output of the comparator $CMP_1$ changes from a logic low value to a logic high value. As a result, the voltage at the q output of the latch LTCH becomes logic high, so that the switch $S_4$ is switched on. The input $VCO_1$ is thus short-circuited to the voltage reference source $VRF_H$. Consequently, the voltage $V_{vco}$ is thus increased from the lower limit value $VRF_L$ to the upper limit value $VRF_H$ within a very brief period of time, so that actually at that instant briefly the above situation occurs in which the voltage $V_{vco}$ can no longer increase and the converter automatically switches over to a different valley. The switch $S_4$ remains switched on until the oscillator signal OSC again switches over from a logic low value to a logic high value. This is because the signal on the reset input of the latch LTCH then becomes logic high, so that the q output becomes logic low again.

Figure 10:
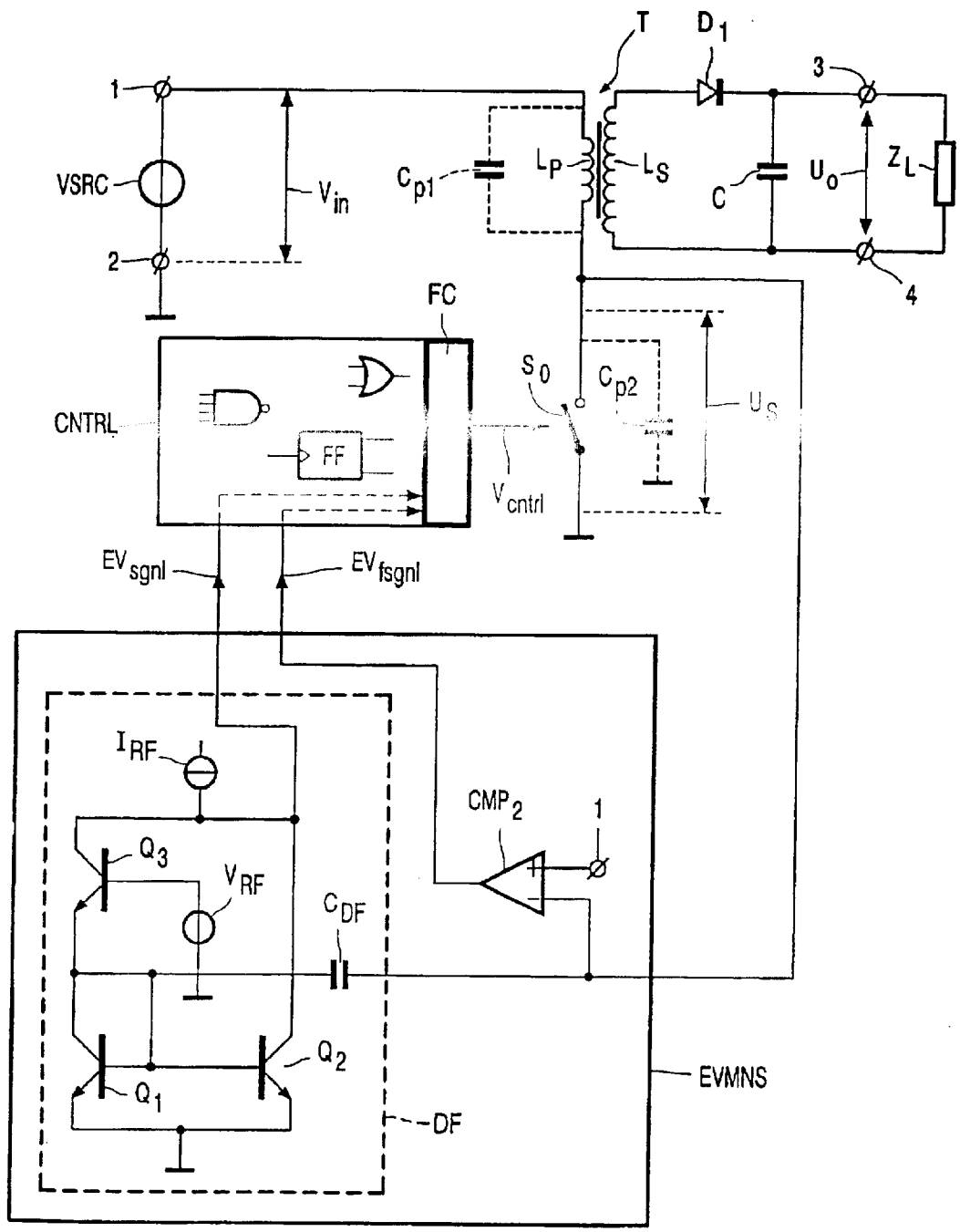

FIG. 10 shows an electrical circuit diagram of an embodiment of a converter in accordance with the invention. The converter includes a comparator $CMP_2$ which is coupled, by way of an output, to the frequency control circuit FC of the control circuit CNTRL in order to supply the evaluation signal $EV_{sgnl}$. The comparator $CMP_2$ has a plus input which is connected to the first supply terminal 1 and a minus input which is connected to the common junction of the primary winding $L_P$ and the switch $S_0$. Consequently, the evaluation signal $EV_{sgnl}$ is at a high level only when the voltage $U_S$ is lower than the input voltage $V_{in}$. (See also the signal diagrams I and III of the FIGS. 6 and 9.) The converter also includes a differentiator DF which is connected, by way of an input, to the common junction of the primary winding $L_P$ and the switch $S_0$ and is coupled, by way of an output, to the frequency control circuit FC of the control circuit CNTRL in order to deliver the further evaluation signal $EV_{fsgnl}$. The further evaluation signal $EV_{fsgnl}$ is at a high level only if the time derivative of the voltage Us is approximately equal to zero. (See also the signal diagrams I and II of the FIGS. 6 and 9.)

The differentiator DF includes a first bipolar transistor $Q_1$ whose collector and base are interconnected and whose emitter is connected to the second supply terminal 2; a second bipolar transistor $Q_2$ whose emitter is connected to the second supply terminal 2 and whose base is connected to the base of the first bipolar transistor $Q_1$ while its collector forms the output of the differentiator DF; a third bipolar transistor $Q_3$ whose emitter is connected to the collector of the first bipolar transistor $Q_1$ while its collector is connected to the collector of the second bipolar transistor $Q_2$; a capacitor CDF which is coupled between the common junction of the primary winding $L_P$ and the switch $S_0$ and the emitter of the third bipolar transistor $Q_3$; a reference voltage source $V_{RF}$ which is coupled between a base of the third bipolar transistor $Q_3$ and the second supply terminal 2; and a reference current source IRF which is coupled to the output of the differentiator DF.

The operation of the differentiator DF is as follows. The first and the second bipolar transistor $Q_1$ and $Q_2$ together constitute a current mirror. A positive current (that is a current in the direction of the emitter and the collector of the third and the first bipolar transistor $Q_3$ and $Q_1$, respectively) through the capacitor $C_{DF}$ is mirrored by the current mirror and hence appears in inverted form at the output of the current mirror, which output is formed by the collector of the second bipolar transistor $Q_2$. A negative current through the capacitor $C_{DF}$ flows through the third bipolar transistor $Q_3$ (and not through the current mirror) and hence is not inverted. The differentiator DF, as shown in FIG. 10, actually operates as a current rectifier. When the absolute value of the positive or the negative current through the capacitor $C_{DF}$ is (approximately) smaller than the current delivered by the reference current source $I_{RF}$, the further evaluation signal $EV_{fsgnl}$ has a high level while otherwise the level of the further evaluation signal $EV_{fsgnl}$ is low.

The further evaluation signal $EV_{fsgnl}$ is also influenced by the current mirror ratio of the current mirror. This effect enables a command for switching on the switch $S_0$ to be issued already just before the time derivative of the voltage $U_S$ across the switch $S_0$ equals zero (and hence has a slight negative value) in order to compensate the inevitable response time of electronic control circuits. The current mirror ratio of the current mirror can be adapted, for example, by adaptation of the ratio of emitter surfaces of the first bipolar transistor and the second bipolar transistor $Q_1$ and $Q_2$.

The differentiator DF may also be implemented completely or partly while utilizing field effect transistors.

The converter may also be equipped with other types of differentiator. It is alternatively possible to use a single coil instead of the transformer T. The switch $S_0$ may be constructed, for example, by means of a MOS transistor, a bipolar transistor, a thyristor or a relay. The converter can be realized as an integrated circuit as well as by means of discrete components.

What is claimed is:

1. A converter for converting an input voltage between a first supply terminal and a second supply terminal to an output voltage, which converter includes switching means which, in the operating state, are alternately switched on and off under control of a switching control signal, an inductive element which forms a series circuit in conjunction with the switching means, which series circuit is coupled between the first supply terminal and the second supply terminal, a control circuit for supplying the switching control signal, and evaluation means for evaluating a voltage across the switching means, said voltage exhibiting oscillating, and for supplying the control circuit with information so as to switch on said switching means during a predefined local valley of said voltage, the control circuit including a frequency control circuit for controlling the switching frequency of the switching control signal in such a manner that the switching frequency varies within a frequency window, which is determined by a lower limit frequency and an upper limit frequency and in a manner such that when the switching frequency becomes equal to the lower limit frequency or to the upper limit frequency, the frequency control circuit adapts the switching frequency in such a manner that it again varies within a further frequency window, which is determined by a further lower limit frequency and a further upper limit frequency, the information being adapted in such a manner so as to change said predefined local valley to another valley when the switching frequency becomes equal to the upper limit frequency or the lower limit frequency, the information including an evaluation signal for indicating when the voltage across the switching means is lower than the input voltage, and also a further evaluation signal for indicating when the time derivative of the voltage across the switching means is approximately equal to zero, wherein the frequency control circuit includes: a first counter with an up-input, a down-input, and a data output; a second counter with a reset input, an up-input and a data output; a digital comparator with a first data input which is coupled to the data output of the first counter, a second data input which is coupled to the data output of the second counter, and an output for supplying the switching control signal; means which are coupled so as to receive a first frequency reference signal which corresponds to the lower limit frequency and a second frequency reference signal which corresponds to the upper limit frequency, the means comparing the switching frequency of the switching control signal with the first frequency reference signal and with the second frequency reference signal and supplying, in response to said comparison, either a down signal to the down-input or an up signal to the up-input of the first counter; and means for delivering a valley number signal of the voltage, said valley number signal being derived from the evaluation signal and the further evaluation signal.

2. A converter as claimed in claim 1, wherein the means for delivering the valley number signal include an AND gate which has a first input for receiving the evaluation signal, a second input for receiving the further evaluation signal, and an output for delivering the valley number signal to the up-input of the second counter.

3. A converter as claimed in claim 1, wherein the frequency control circuit includes: a voltage-controlled oscillator which has an input for receiving a VCO control voltage, and an output for supplying an oscillator signal; a first frequency control capacitor for supplying the VCO voltage; a second frequency control capacitor; adaptation means for adapting a voltage across the first frequency control capacitor and the VCO control voltage by connecting the first frequency control capacitor and the second frequency control capacitor in parallel for approximately a period of time during which the switching means are switched on, and by discharging the second frequency control capacitor for approximately a period of time during which the switching means are switched off, and by applying the voltage across the second frequency control capacitor with a value which is higher than the value of the VCO control voltage during a part of the period of time during which the switching means are switched off, said part being determined by the oscillator signal.

4. A converter as claimed in claim 3, wherein the frequency control circuit also includes limiting means for limiting the voltage range of the VCO control voltage to a voltage window which is determined by a lower voltage limit which corresponds to the lower limit frequency and an upper voltage limit which corresponds to the upper limit frequency.

5. A converter as claimed in claim 4, wherein the frequency control circuit also includes an AND gate with a first input for receiving the evaluation signal, a second input for receiving the further evaluation signal, a third input for receiving the oscillator signal, and an output for supplying the switching control signal.

* * * * *